W. C. SMITH.
RIM.
APPLICATION FILED JAN. 29, 1921.

1,398,807.

Patented Nov. 29, 1921.
2 SHEETS—SHEET 1.

William C. Smith.
INVENTOR

BY Victor J. Evans
ATTORNEY

WITNESS:

W. C. SMITH.
RIM.
APPLICATION FILED JAN. 29, 1921.
1,398,807.
Patented Nov. 29, 1921.
2 SHEETS—SHEET 2.
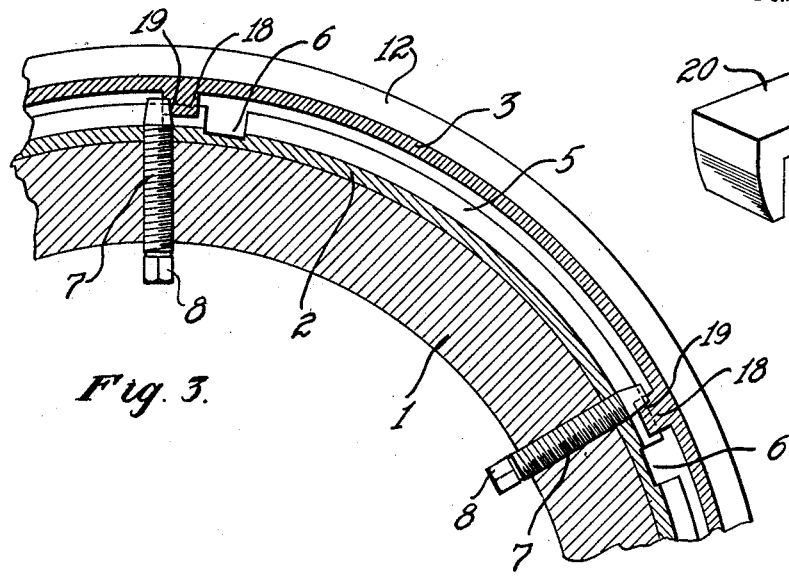
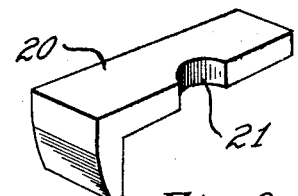
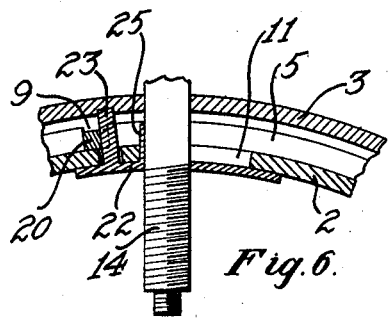
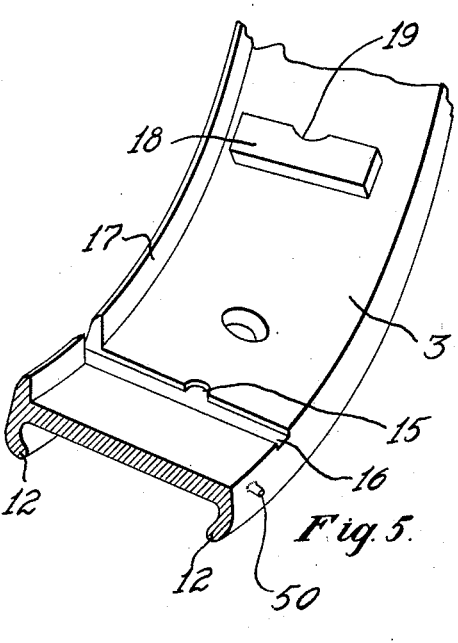
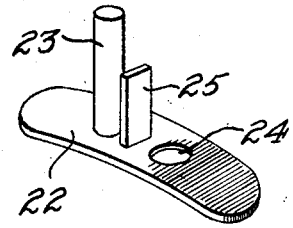
William C. Smith.
INVENTOR
BY Victor J. Evans
ATTORNEY
WITNESS:

UNITED STATES PATENT OFFICE.

WILLIAM C. SMITH, OF ROBINSON, ILLINOIS.

RIM.

1,398,807. Specification of Letters Patent. Patented Nov. 29, 1921.

Application filed January 29, 1921. Serial No. 440,966.

*To all whom it may concern:*

Be it known that I, WILLIAM C. SMITH, a citizen of the United States, residing at Robinson, in the county of Crawford and State of Illinois, have invented new and useful Improvements in Rims, of which the following is a specification.

My present invention has reference to vehicle wheels, and relates particularly to the rims therefor.

The primary object of the invention is to produce a rim including a section which is fixed to the felly of the wheel and a second tire carrying section designed to be received over the wheel section, interengaging means being provided between the sections for holding the same against circumferential or lateral movement, and means being provided for sustaining the sections thus associated, the last mentioned means being easily removed, whereby the sections may be disassembled when desired.

Other objects and advantages will present themselves as the nature of the invention is better understood, reference being had to the drawings which accompany and which form part of this application, and in which:—

Fig. 3 is a sectional view on the line 3—3 of Fig. 2.

Fig. 5 is a fragmentary perspective view looking toward the inner surface of the tire carrying rim section.

Fig. 6 is a greatly enlarged sectional view taken in a line with the tire valve, the latter being in elevation.

Fig. 7 is a perspective view of the locking plate.

Fig. 8 is a similar view of the locking key.

Figure 1:
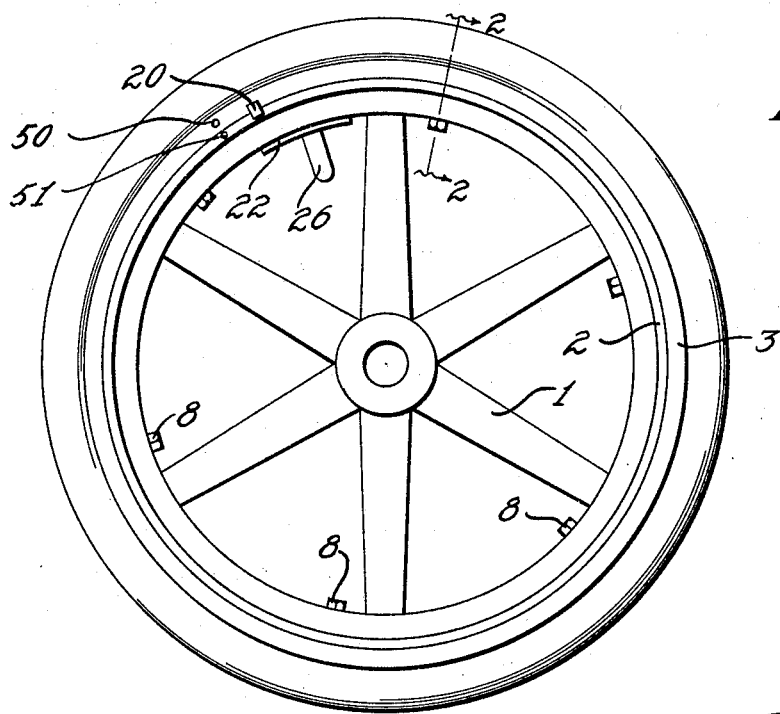
Figure 1 is a side elevation of a wheel provided with my improved rim construction.
Figure 2:
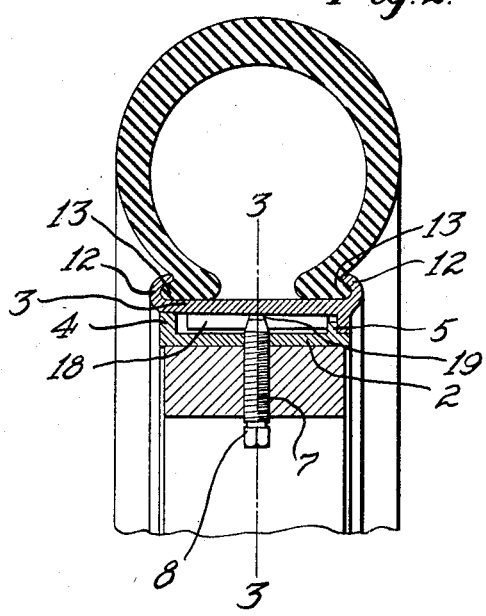
Fig. 2 is a greatly enlarged sectional view approximately on the line 2—2 of Fig. 1.
Figure 4:
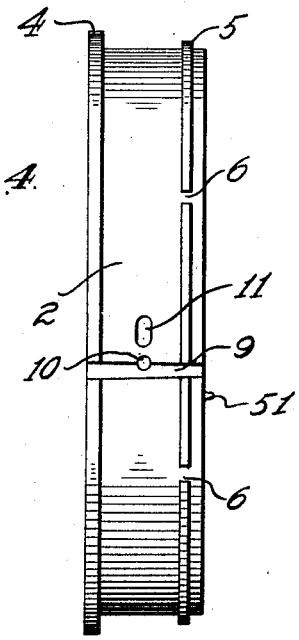
Fig. 4 is an edge view looking toward the section of the rim which is attached to the wheel.

Referring now to the drawings in detail, the numeral 1 designates an ordinary vehicle wheel which is provided with my improved rim.

The rim includes an inner section which is arranged around the felly of the wheel and secured thereto. This section is broadly indicated by the numeral 2, and will, for the sake of convenience be referred to as the wheel rim. In this connection, it is thought well to state that if desired, the section 2 may be employed in lieu of the usual felly for the wheel, and such may be found desirable when the wheel is constructed wholly of metal. The outer rim section, which carries the tire, is broadly indicated by the numeral 3, and will hereinafter be, for the sake of convenience, referred to as the tire carrying rim.

The wheel rim 2 has one of its edges provided with a continuous outstanding flange 4, and is also provided adjacent its opposite edge with a continuous outstanding bead 5. The bead is of a less width than the flange and the said bead at predetermined intervals is notched, as at 6. Inward of each of the notches, and approximately centrally in the passage between the bead and flange, the wheel rim has threaded orifices through which are screwed bolts 7. These bolts have squared heads 8 and have the ends of their shanks cone-shaped and non-threaded.

At a determined point, the wheel rim 2 is provided with a wedge-shaped transverse notch or depression 9 that passes through both its bead and flange, as well as the outer surface of the said rim. A transverse orifice 10 passes through the lower wall provided by the transverse notch 9, and at a slight distance from the said orifice there is an elongated slot 11.

The outer periphery of the wheel rim 2 is arranged at a slight inward angle from the flange 4 to the opposite edge thereof, and the inner periphery of the tire carrying rim 3 is arranged at a slight inclination complementary to that of the wheel rim 2. The tire carrying rim has its edges provided with the usual heads 12 to receive therebetween the beaded edges of the tire 13. The valve casing 14 for the tire passes through a suitable opening in the tire carrying rim 3, and adjacent to the said valve casing the inner periphery of the tire carrying rim has a depression 15 and a transverse groove 16 that intersects the depression. The groove 16 also passes through a continuous flange 17 formed on one of the edges and extending inwardly of the tire carrying rim. At equi-distant points on the inner periphery of the tire carrying rim, corresponding in number to the bolts 7 of the wheel rim, there are formed lugs 18, and each of the said lugs has one of its faces provided with a conical notch 19 for the conical ends of the bolts, when the tire rim is arranged on the wheel rim. In arranging the tire carrying rim on the wheel rim the valve casing 14 is passed through the elongated slot or opening 11 in the wheel rim. One of the arms is, of course, canted with respect to the other. When so arranged the notches in the bead 5 are in a position to receive therethrough the lugs 18 of the tire carrying rim, so that the rim sections may be brought one over the other. The tire carrying rim is then turned circumferentially on the wheel rim so that the ends of the bolts 7 are received in the conical notches 19 of the lugs 18. This turning movement is permitted by the elongated slot 11. Such movement brings the grooves 16 and 9 in alinement, and a wedge key 20 is then passed through said grooves. The wedge key 20 is centrally notched as at 21, the notch being in register with the orifices 10 of the wheel rim and the depression 15 in the tire carrying rim.

By providing the bolts with the cone-shaped ends and by providing the conical notches in the lugs 18 to receive said ends of the bolts the tire carrying rim will be prevented from moving circumferentially or laterally on the wheel rim. In addition to this, these elements provide means for taking up any loose play in the rim which may be caused from wear or from any other cause by simply tightening the bolts when the rim becomes loose. The heads 8 of the bolts are comparatively small, not exceeding, at their greatest diameter, the cross sectional diameter of the threaded shanks of the bolts. The key 20 is wedge-shaped both in width and thickness, and the grooves 16 and 9 are complementary shaped. While the key is effectively held in the grooves, the shape thereof and the shape of the grooves permit the ready removal of the key when the tire sections are to be disassociated.

To facilitate the disassociation of the tire sections, each of these members is provided with outstanding lugs 50 and 51 respectively. The implement arranged between these lugs, and employing one of the lugs has a fulcrum so that a proper bearing can be had against the other lug to cause the circumferential movement of the tire carrying rim on the wheel rim after the locking elements have been removed so that the tire carrying rim can be thus readily moved off of the wheel rim.

The numeral 22 designates a comparatively small spring plate that has on its inner face a projecting pin 23 that is designed to be passed through the orifices 10, the notch 21 of the key 20 and enter the depression 15. The plate is further provided with an opening 24 through which the valve casing or stem 14 passes, and further has its under face, opposite the said opening 24 provided with a depending finger 25 that is received through the slot 11 and is preferably of spring material to contact with the valve casing or stem. Thus the rim sections are held against circumferential or lateral movement, and to lock the same in such position the valve cap 26 is screwed over the valve casing and is brought into tight contact with the plate 22.

A rim constructed in accordance with my invention may have its sections quickly associated or disassembled. To disassemble the sections, it is merely necessary to remove the cap of the valve, the plate and the key, then turn one of the sections on the other. The elongated slot or opening 11, when the sections are turned will have one of its end walls in contact with the valve casing when the notches 6 are in a position to receive therethrough the lugs 18, and one of the sections is canted with respect to the other, as described in the association of the parts.

The contacting engagement of the flanges with the edges of the respective sections of the rim will hold the rim against lateral movement. The bolts are pocketed in the notches of the lugs and thus the rim sections are held against circumferential movement.

The notches in the lugs of the wheel section may register with depressions in the said section, and the bolts may be screwed to be received in said depressions if desired.

It is thought that the foregoing description, when taken in connection with the drawings will fully set forth the construction and advantages of the improvement to those skilled in the art to which such inventions relate, but it is to be understood that the nature of the invention is such as to render the same susceptible to various changes and modifications all of which, however, falling within the scope of what is claimed.

Having described the invention, I claim:—

A wheel rim comprising a section fixed on a wheel, a tire carrying section surrounding the wheel section, contacting flanges on the opposite edges of the sections, the confronting surfaces of the sections having transverse wedge grooves, orifices intersecting the grooves, and the wheel carrying section having an elongated opening for the passage of the valve stem of the tire carried by the tire carrying section, means between the sections designed to be brought into interengaging position when one of the sections is turned circumferentially on the other section, and the referred to grooves and orifices designed to aline when the sections are thus related, a notched wedge key passing through the grooves, a plate having a depending finger passing through the orifices and the notch in the groove, said plate also having a spring finger designed to be received in the slot for the valve casing and to contact with said casing, and the cap of the valve casing designed to be screwed thereon and to contact with the plate, all as and for the purpose set forth.

In testimony whereof I affix my signature.

WILLIAM C. SMITH.